UNITED STATES PATENT OFFICE.

CARLETON ELLIS, OF WHITE PLAINS, NEW YORK, ASSIGNOR, BY DIRECT AND MESNE ASSIGNMENTS, TO ELLIS-FOSTER COMPANY, A CORPORATION OF NEW JERSEY.

FLUX.

No. 852,017.      Specification of Letters Patent.      Patented April 30, 1907.

Application filed March 23, 1906. Serial No. 307,671.

*To all whom it may concern:*

Be it known that I, CARLETON ELLIS, a citizen of the United States, and a resident of White Plains, in the county of Westchester and State of New York, have invented certain new and useful Improvements in Composition for Brazing Cast-Iron, of which the following is a specification.

My invention relates to a composition of matter for facilitating the soldering or brazing of cast iron surfaces and has for its object the attainment of a firmly soldered joint without the necessity of resorting to the high brazing temperatures heretofore employed, all as more fully hereinafter pointed out, matters of novelty being particularly enunciated in the appended claims.

Owing to the impurities of carbon, silicon etc., cast iron has proven peculiarly difficult to solder or braze without the employment of oxidizing fluxes. Certain of these now in use contain heavy metallic oxids which, it is alleged, remove the impurities by selective oxidation and form a sort of wrought iron surface to which the solder or spelter will adhere. In attempting to braze cast iron with fluxes containing metallic oxids I have found a very high temperature to be required to complete the operation and that such elevated temperatures produced, especially with large articles as pulleys and irregularly shaped castings, a series of strains and stresses; which might even be of so great severity as to cause fractures in the article at some cooler portion remote from the seat of heat application. I have therefore conducted exhaustive experiments and tests to obtain a flux which would braze efficiently at a relatively low temperature. An essential element of such a flux I have found in chemically pure and finely divided iron. Another element is anhydrous borax or other easily fusible, non-oxidizing anhydrous salt or compound. The action of a flux of this character, viz: pure iron and anhydrous borax, is to remove the impurities from the cast iron surfaces to be joined, by a sort of impregnation. In other words the chemically pure iron at a low red heat is most avidious for carbon, silica, etc., and absorbs these bodies from the cast iron surfaces with great rapidity. Thereby the surfaces are purified and put into condition for uniting with the solder or spelter which is subsequently introduced.

The finely-divided chemically pure iron which I employ must be carefully prepared. For this purpose oxalate of iron may be ignited in a current of hydrogen or the iron may be otherwise chemically prepared. Of course care must be taken in the production of this material from iron salts that the iron is not yielded in so finely divided a state as to be pyrophoric.

So far as my observations go it is well known to employ brazing compositions containing ordinary iron filings, etc., containing to a greater or less degree the same impurities as cast iron and therefore not suited for the present invention. I am the first however, so far as I am advised, to realize and make use of the peculiar properties of chemically pure iron for the brazing of cast iron.

A suitable composition for general purposes may be obtained by mixing thoroughly the following: Fused borax (pulverized) 12 lbs. Iron powder, C. P. 40 lbs. Carbonate of potash, C. P. 9 lbs. The last named ingredient may however under certain circumstances be replaced by borax. A quantity of this mixture is worked up with water to a thick paste and is applied to the cold cast iron surfaces to be joined. The surfaces are then pressed into contact and are heated by a gas flame or otherwise. When the brazing temperature is reached the solder is run in together with copious additions of anhydrous borax until union is complete when the object is carefully cooled and cleaned. During the stage of cooling the pieces of cast iron should be kept in immovable contact. In this manner iron castings of every description may be easily and firmly joined. The difficulties heretofore attendant on the brazing of hubs, pulley spokes, propeller blades, etc., do not obtain with my invention owing to the rapid action of the composition and to the relatively low temperature required.

What I claim is:

1. Brazing flux which consists of chemically pure iron and a fusible salt.

2. Brazing flux for cast iron which consists of chemically-pure finely divided iron, anhydrous borax and carbonate of potash.

3. Composition for fluxing cast iron surfaces in the soldering thereof which consists of pure finely-divided iron and anhydrous borax.

4. Brazing flux for cast iron consisting of chemically-pure finely-divided iron and finely divided anhydrous borax in intimate mixture.

5. Brazing flux for cast iron consisting of chemically-pure finely-divided iron and an easily fusible non-oxidizing anhydrous salt.

6. Brazing flux consisting of chemically pure iron powder, fused borax powder and pure carbonate of potash substantially in the proportions specified.

7. Brazing flux for cast iron surfaces which comprises an intimate mixture of pure iron powder and pulverized anhydrous borax.

8. Brazing flux for cast iron surfaces which consists of pure iron powder forty parts, anhydrous pulverized borax twelve parts, and carbonate of potash nine parts.

Signed at New York in the county of New York and State of New York this 14th day of March A. D. 1906.

CARLETON ELLIS.

Witnesses:
FRED I. SMITH,
FLETCHER P. SCOFIELD.